United States Patent [19]

Miller

[11] Patent Number: 5,390,203
[45] Date of Patent: Feb. 14, 1995

[54] METHOD AND APPARATUS FOR LOCKING LASER WAVELENGTH TO AN ATOMIC TRANSITION

[75] Inventor: Stephen A. Miller, Upland, Calif.

[73] Assignee: The United States of America as represented by the Secretary of the Navy, Washington, D.C.

[21] Appl. No.: 263,206

[22] Filed: Jun. 13, 1994

[51] Int. Cl.⁶ .............................................. H01S 3/13
[52] U.S. Cl. .......................................... 372/29; 372/37;
372/56; 372/106; 372/38; 372/32
[58] Field of Search ...................... 372/106, 38, 37, 56,
372/29, 32, 55

[56] References Cited

U.S. PATENT DOCUMENTS

| | | |
|---|---|---|
| 4,685,111 | 8/1987 | Baer . |
| 4,896,324 | 1/1990 | Ball et al. . |
| 4,912,716 | 3/1990 | Mead ..................................... 372/32 |
| 4,975,918 | 12/1990 | Morton . |
| 5,014,278 | 5/1991 | Deki ..................................... 372/32 |
| 5,042,042 | 8/1991 | Hori et al. ............................. 372/32 |
| 5,063,568 | 11/1991 | Chiba et al. . |
| 5,107,511 | 4/1992 | Nakatani et al. . |

*Primary Examiner*—Léon Scott, Jr.
*Attorney, Agent, or Firm*—Harvey Fendelman; Thomas Glenn Keough

[57] ABSTRACT

An apparatus and method for stabilizing laser light wavelength relative to a resonant optical absorption works with both continuous wave and pulsed lasers and employs the phenomenon of Zeeman energy level splitting to provide a error signal indicative of both the direction and magnitude of wavelength error.

A laser system including a wavelength adjusting means produces laser light at a wavelength which differs by an adjustable amount from a resonant absorption wavelength of a selected substance. A first portion of the laser light is propagated through a right circular polarizing means to provide right circularly polarized (RCP) laser light. RCP laser light is propagated through a first volume occupied by the selected substance, said first volume being disposed in a magnetic field. The magnetic field vector is substantially parallel to the direction of laser light propagation within the first volume. A second portion of the laser light is propagated through a left circular polarizing means to provide left circularly polarized (LCP) light. LCP light is propagated through a second volume occupied by the selected substance, the second volume being disposed likewise in a magnetic field with magnetic field vector substantially parallel to the line of laser light propagation within the volume.

First detecting means is provided to selectively detect fluorescence light produced by RCP laser light and produce a first signal. Second detecting means is provided to selectively detect fluorescence light produced by LCP laser light and produce a second signal.

A signal processing means is adapted to process the first signal and the second signal and to produce an error signal indicating the direction and magnitude of difference between the laser light wavelength and the desired wavelength. The error signal is converted into a controlling signal which is provided to the wavelength adjusting means to stabilize the wavelength of the laser light at the desired value.

64 Claims, 4 Drawing Sheets

METHOD AND APPARATUS FOR LOCKING LASER WAVELENGTH TO AN ATOMIC TRANSITION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to methods and apparatus for stabilizing the output wavelength of a laser, and more particularly, to a method and apparatus in which Zeeman splitting of atomic energy levels provides a signed error signal to stabilize laser light relative to a resonant optical transition.

Many laser applications require that the output wavelength of the laser be precisely controlled. In particular, it is sometimes required that the laser wavelength be locked relative to the wavelength of an atomic transition. One such application is the use of blue-green light pulses to communicate through ocean water.

Water strongly attenuates most wavelengths of electromagnetic radiation. However, a region of transparency exists for blue-green light. An exceptionally effective filter for light within the transparency region is provided by the cesium (Cs) resonance filter. The Cs resonance filter works by absorbing light at one wavelength in the blue and producing fluorescence at a longer wavelength in the near infrared. By using very brief pulses of light which are precisely tuned to the narrow absorption of the Cs resonance filter, it is possible for undersea receivers to receive communication signals and filter out competing light which causes noise. To use such a communication scheme, it is necessary to produce intense light pulses at a wavelength which precisely matches the Cs resonance filter. Very brief, intense pulses are required in order to improve the discrimination of the signal from environmental light sources which are slowly varying.

One method for locking a laser to the wavelength of the Cs resonance filter is to use Cs fluorescence to produce an electronic reference signal or error signal. The laser light wavelength is varied, and some of the laser light is used to excite Cs fluorescence. The fluorescence light is detected to produce a reference signal which is maximized when the laser light is at the desired wavelength. The disadvantage of this method is that the reference signal is not indicative of whether the laser wavelength is greater or less than the absorption wavelength. When the laser wavelength drifts it is necessary to adjust it back and forth to find the reference signal maximum. This process interrupts the communication signal for an unacceptable interval.

A second method for locking a laser wavelength to an atomic transition has been disclosed by R. D. Mead in U.S. patent application Ser. No. 4,912,716. Mead teaches a method and apparatus for stabilizing a laser frequency relative to Cs absorption which provides an error signal that indicates both the direction and magnitude of wavelength error. The method employs microwave frequency modulation of the laser wavelength to produce sidebands. A sideband of the modulated laser light is selectively detected and processed to produce an error signal which has a sign and magnitude that are functionally dependent on the direction and magnitude of the difference of the laser wavelength from the desired value.

The method taught by Mead overcomes the aforementioned difficulty of not having an error signal indicating the direction of laser wavelength error. However, Mead's teachings can only be applied for lasers operating in continuous wave (CW) or quasi-CW mode. Very brief light pulses cannot be modulated at a microwave frequency. Since very brief light pulses are essential for undersea communication, a method for efficiently stabilizing the wavelength of pulsed laser sources is needed.

Therefore, according to this inventive concept a need has been discovered for a way to stabilize laser output wavelength which provides an error signal indicative of direction and magnitude of wavelength error, and which can be utilized with both pulsed and CW lasers. Applications include undersea communication, photochemical isotope separation, and many other laser applications requiring that the laser light wavelength be precisely controlled.

SUMMARY OF THE INVENTION

In accordance with the present invention, the above noted problems of the prior art are overcome and there are provided apparatus and method for stabilizing laser light at a wavelength fixed with respect to an atomic transition. The inventive concept employs the phenomenon of Zeeman energy level splitting and provides an error signal that indicates the direction and magnitude of wavelength error.

A first aspect of this inventive concept is embodied by apparatus for stabilizing laser light at a desired wavelength which differs from an absorption wavelength of a fluorescent substance by an adjustable amount. A laser system including a wavelength adjusting means provides laser light. A first portion of the laser light is propagated through a right circular polarizing means to provide right circularly polarized (RCP) laser light. RCP laser light is propagated through a first volume containing the fluorescent substance, said first volume being disposed in a magnetic field. The orientation of the magnetic field is substantially parallel to the line of laser light propagation within the volume. A second portion of the laser light is propagated through a left circular polarizing means to provide left circularly polarized (LCP) light. LCP light is propagated through a second volume containing the fluorescent substance, said second volume being disposed likewise in a magnetic field which is oriented substantially parallel to the line of laser light propagation within the volume.

A first detection means selectively detects a portion of RCP laser light before transmission through the fluorescent substance and produces a first signal. A second detection means selectively detects fluorescence light produced by RCP laser light and produces a second signal. A third detection means selectively detects a portion of LCP laser light before transmission through the fluorescent substance and produces a third signal. A fourth detection means selectively detects fluorescence light produced by LCP laser light and produces a fourth signal.

A signal processing means is adapted to process the first signal, the second signal, the third signal, and the fourth signal and to produce therefrom an error signal that indicates the direction and magnitude of the difference between the laser light wavelength and the desired wavelength. Means is provided to convert the error signal into a controlling signal which is conveyed to the wavelength adjusting means to adjust the wavelength of the laser light.

A second aspect of this inventive concept is embodied by a method for stabilizing laser light at a desired wavelength which differs from an absorption wavelength of a fluorescent substance by an adjustable amount. The method includes the following steps: (1) propagating a first portion of the laser light through a right circular polarizing means; (2) selectively detecting a portion of the RCP laser light to produce a first signal; (3) propagating RCP laser light through the fluorescent substance occupying a first volume that is disposed in a magnetic field oriented substantially parallel to the line of RCP laser light propagation; (4) propagating a second portion of the laser light through a left circular polarizing means; (5) selectively detecting a portion of the LCP laser light to produce a second signal; (6) propagating LCP laser light through the fluorescent substance occupying a second volume disposed in a magnetic field oriented substantially parallel to the direction of LCP laser light propagation; (7) selectively detecting fluorescence light produced by RCP laser light to produce a third signal; (8) selectively detecting fluorescence light produced by LCP laser light to produce signal a fourth signal; (9) processing the first signal, the second signal, the third signal, and the fourth signal to produce an error signal that indicates the direction and magnitude of the difference between the laser light wavelength and the desired wavelength; (10) and converting the error signal into a controlling signal to control wavelength adjusting means to adjust the wavelength of the laser light.

OBJECTS OF THE INVENTION

An object of the invention is to provide apparatus and method for stabilizing the wavelength of laser light by employing Zeeman splitting of atomic electron energy levels.

A second object of the invention is to provide apparatus and method for stabilizing the wavelength of laser light which includes producing an error signal that indicates the direction and magnitude of difference between laser light wavelength and a desired wavelength.

A third object of the invention is to provide apparatus and method for stabilizing the wavelength of laser light which can be used with both CW and pulsed lasers.

These and other objects of the invention will become more readily apparent from the ensuing specification and claims when taken in conjunction with the appended drawings.

DESCRIPTION OF THE PREFERRED EMBODIMENTS

Figure 1:
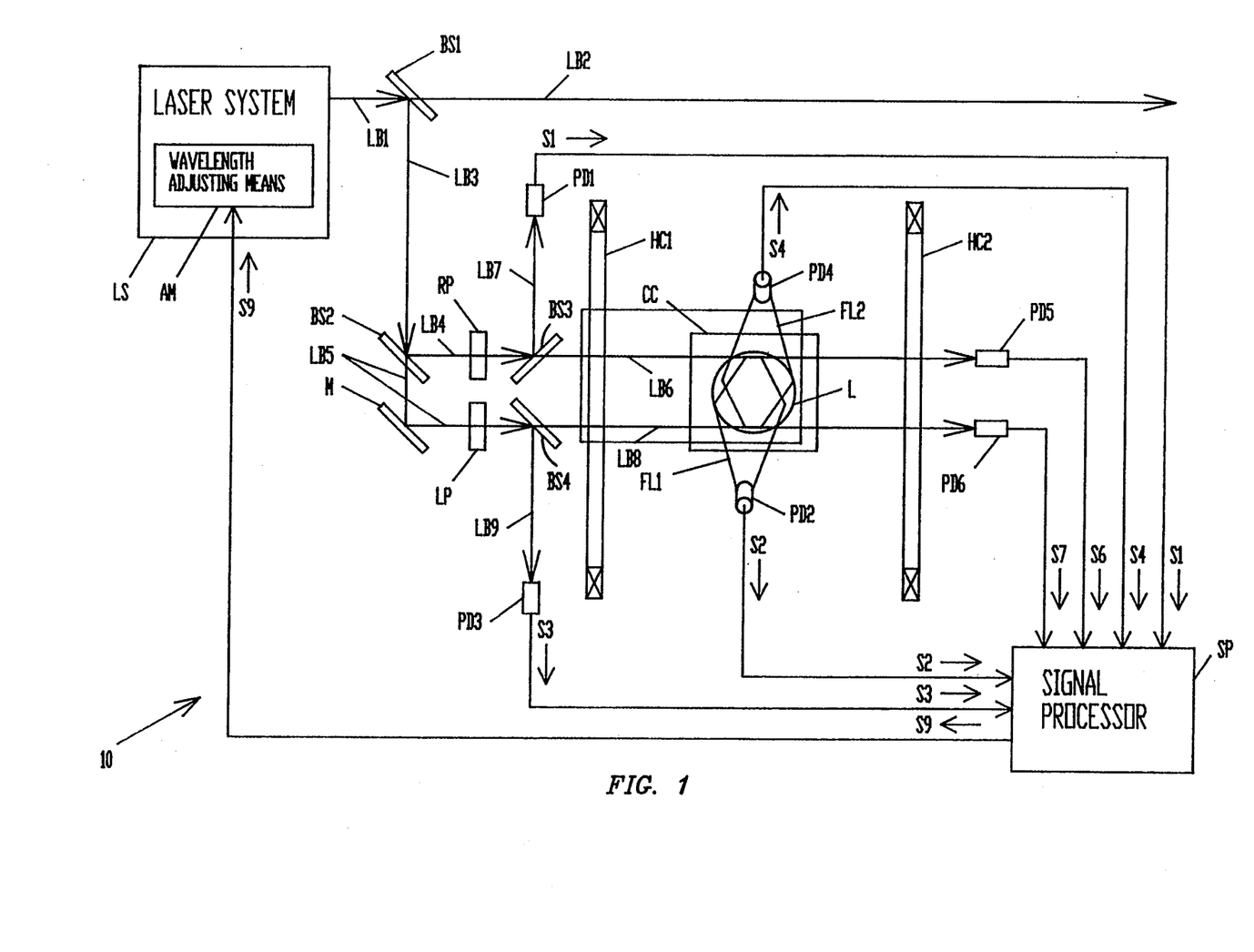
FIG. 1 is a diagram of a laser light stabilizing apparatus.

Referring to FIG. 1 there is shown a schematic diagram of a laser light stabilizing apparatus 10 in accordance with the present invention. A linearly polarized light beam LB1 from laser system LS is split into two portions, a light beam LB2 and a light beam LB3, by a beam splitter BS1. Light beam LB2 is provided to any desired application. Light beam LB3 is further split into light beams LB4 and LB5 by a beam splitter BS2.

Light beam LB4 is converted from linear polarization to right circular polarization (RCP) by propagation through right circular polarizing component RP, which is a commercially available standard optical component. After passing through the right circular polarizing component, light beam LB4 is split by beam splitter BS3 into light beams LB6 and LB7. Light beam LB7 is detected by a photodetector PD1 to provide a signal proportional to the intensity of RCP light. Light beam LB6 is propagated into Cs cell CC.

A Cs cell CC contains cesium vapor maintained at a desired temperature, and is suitably designed to absorb light from an input light beam which has a wavelength that matches an atomic transition of the Cs vapor. Atomic transitions will be further discussed hereinbelow. Cs cell CC is also designed so that fluorescence stimulated by an input light beam is received by a photodetector. Cs cell CC is a fluorescence cell similar to that used in a Cs resonance filter. Fabrication and operation of fluorescence cells in general and Cs cells in particular are well known to persons skilled in the art of spectroscopy.

The choice of Cs vapor as a fluorescent substance is by way of example only. As will be apparent from the teachings which follow, the use of many fluorescent substances in vapor, liquid, or solid form, is comprehended within the scope of the instant invention.

Cesium cell CC is situated within a magnetic field created by Helmholz coils HC1 and HC2. Helmholz coils are a well known means of producing a uniform magnetic field in a region near the axis midway between paired coils. Alternative means for generating a magnetic field may include other electromagnetic coil configurations, for example, or the use of one or more permanent magnets as another example. The direction of the magnetic field vector in the active region of the Cs cell is substantially parallel to the direction of propagation of light beam LB6. The active region of the Cs cell is the selected volume from which fluorescence light is detected. Alternatively, the magnetic field vector can be antiparallel to the propagation direction. The purpose of the magnetic field is to produce Zeeman splitting of the Cs vapor atomic energy levels, thereby causing the resonant absorption wavelength for RCP light to be shifted relative to the resonant absorption wavelength of LCP light. This phenomenon will be further discussed hereinbelow.

Light beam LB5 is directed by mirror M through left circular polarizing component LP and converted from linearly polarized light to LCP light. Similarly to the right circular polarizing component, a left circular polarizing component is a commercially available standard optical component. A beam splitter BS4 splits light beam LB5 into light beams LB8 and LB9. Light beam LB9 is detected by a photodetector PD3 to produce a signal proportional to the intensity of LCP light. LCP light beam LB8 is propagated into Cs cell CC.

RCP light beam LB6 and LCP light beam LB8 propagate into Cs cell CC and produce fluorescence light FL1 and FL2 respectively. Fluorescence light FL1 from a selected first volume is focused by a positive focal length lens L onto photodetector PD2. As an example, lens L may be a plano-convex lens, shown in axial view in FIG. 1. The disposition of lens L and photodetector PD2 are such that substantially the only light which is detected by photodetector PD2 is fluorescence light FL1 generated by RCP light beam LB6 in the first volume. In FIG. 1 lens L is represented as being above Cs cell CC and photodetectors PD2 and PD4 are above lens L. This geometry is by way of example only, since many optical configurations can be employed to obtain the desired effect. Likewise, fluorescence light FL2 from a selected second volume is focused by lens L onto a photodetector PD4 as shown. The disposition of lens L and photodetector PD4 are such that substantially the only light which is detected by PD4 is fluorescence light FL2 generated by LCP light LB8 in the second volume. To restate the foregoing, photodetector PD2 is disposed to selectively detect fluorescence light FL1 from a first volume, and photodetector PD4 is disposed to selectively detect fluorescence light FL2 from a second volume. Alternative methods for accomplishing this result include using more than one lens, using more than one Cs cell, using light baffles, and many other methods which are obvious to practitioners of optical layout design.

Photodetectors PD1, PD2, PD3, and PD4 may be photodiodes, photomultiplier tubes or any other light detecting means which are sensitive to the wavelengths to be detected. Their function is to receive light and provide an electrical signal indicating the intensity of light received.

Photodetector PD1 is disposed to receive light beam LB7 and to produce electrical signal S1 in response thereto. Photodetector PD2 produces electrical signal S2 in response to fluorescence light FL1. Photodetector PD3 is disposed to receive light beam LB9 and to produce electrical signal S3 in response thereto. Photodetector PD4 produces electrical signal S4 in response to fluorescence light FL2. Signals S1, S2, S3, and S4 are conveyed to a signal processor SP. Signal processor SP processes the signals S1, S2, S3, and S4 according to a formula discussed hereinbelow and produces an error signal S5 that indicates the direction and magnitude of the laser light wavelength error. (Error signal S5 does not appear in FIG. 1, but is discussed hereinbelow in reference to FIG. 3(c).) Error signal S5 is converted by suitable scaling and offsetting operations into a controlling signal S9. The means for converting error signal S5 into a controlling signal is included in signal processor SP. As an alternative, separate electronic apparatus may be supplied for this purpose. The electronic operations specified hereinabove are well understood by electronic engineers, and will be further discussed hereinbelow. The controlling signal is provided to wavelength adjusting means AM associated with laser system LS.

Laser system LS includes wavelength adjusting means AM for adjusting the output wavelength of light beam LB1. Such wavelength adjusting means may include an etalon for example. The position and/or temperature of the etalon would be, in this example, controlled by a controlling signal derived by suitably scaling and offsetting error signal S5. Alternatively, the wavelength adjusting means may include a laser diode source which has an output wavelength adjustable according to the bias current and/or temperature of the laser diode source. The bias current and/or temperature of the laser diode would be, in this example, likewise controlled by a controlling signal derived from error signal S5. Many controllable wavelength adjusting means for adjusting the output wavelength of laser systems are known to those skilled in the art, and all such wavelength adjusting means are comprehended within the scope of the present invention.

PRINCIPLE OF OPERATION

The principle of operation for this inventive concept will be illustrated with reference to atomic Cs. However, in light of the teachings which follow, it will be obvious to persons with knowledge in the fields of physics and spectroscopy that the same principle of operation can be applied to other atomic or molecular species. In general, the practice of the present invention comprehends using any substance in solid, liquid, plasma, or vapor form which is included in the class or group of substances wherein Zeeman splitting of optical resonance lines can be observed by either optical absorption or fluorescence.

Figure 2:
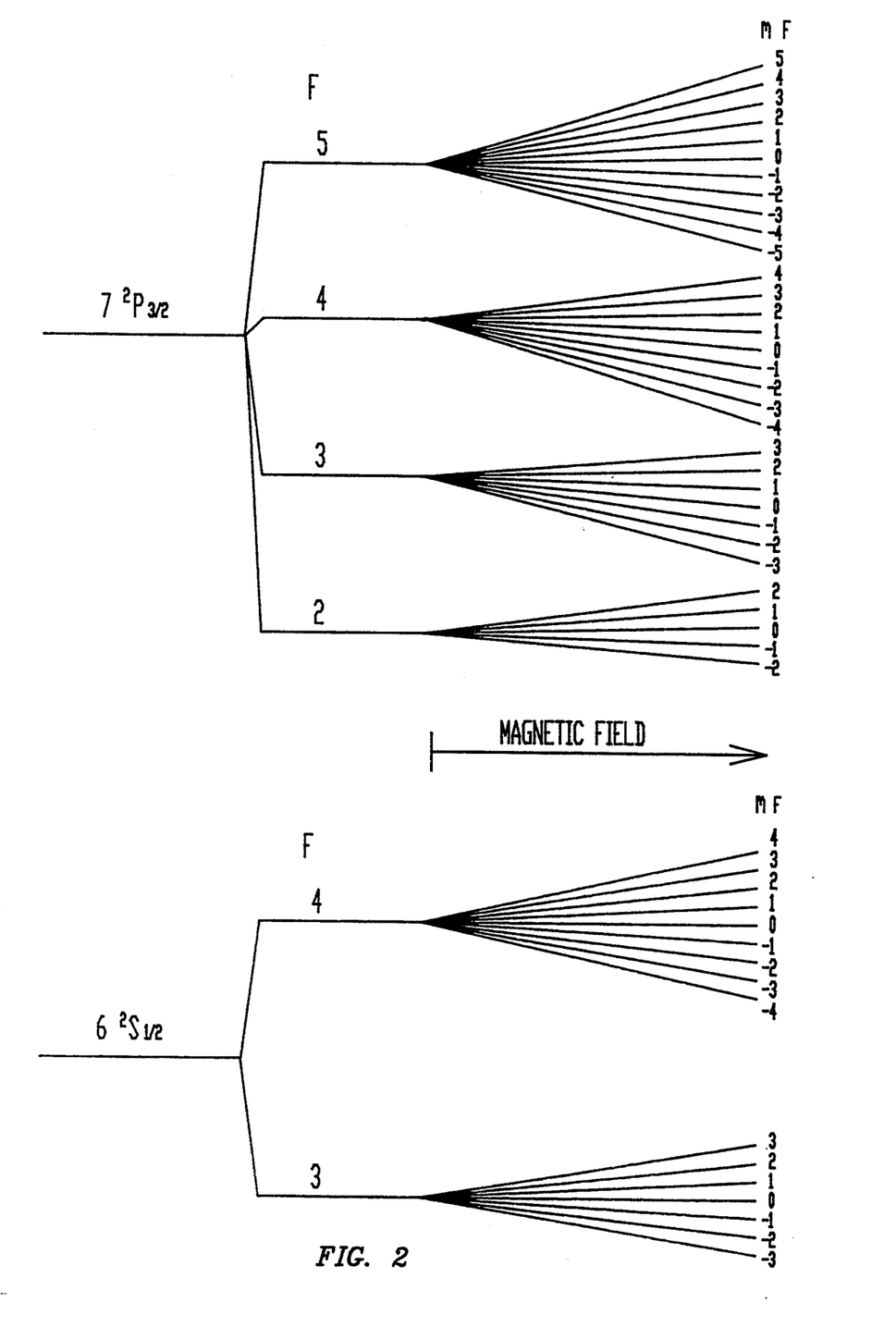
FIG. 2 is an illustration of the effect of magnetic field on selected Cs atomic energy levels.

FIG. 2 shows two selected energy levels, $6^2 S_{\frac{1}{2}}$ and $7\ ^2P_{3/2}$, of atomic Cs. Standard spectroscopic symbols are used to label the levels. In an unexcited state, atomic Cs has one electron outside of filled shells in a doublet ground state level $6\ ^2S_{\frac{1}{2}}$, which is split by the hyperfine interaction into two levels corresponding to total angular momentum quantum numbers F=3 and F=4 as illustrated. An energy level which can be populated by light with a wavelength of about 455.5 nanometer (nm) is the level $7\ ^2P_{3/2}$. It is split by the hyperfine interaction into four levels corresponding to total angular momentum quantum numbers F=5, F=4, F=3, and F=2. When a magnetic field is applied, each hyperfine energy level is split further into 2F+1 levels designated by quantum numbers $m_F$. The effect of magnetic field is illustrated in FIG. 2.

The energy levels shown in FIG. 2 are complicated primarily due to the effect of the hyperfine interaction. If the magnetic field strength is increased to a magnitude larger than illustrated in FIG. 2, the energy levels cross over one another in a complicated manner. However, an essential feature can be seen from FIG. 2, and that is that each energy level has an angular momentum quantum number F, and further that in the presence of a magnetic field the angular momentum is further characterized by a quantum number $m_F$ which represents the projection of the angular momentum in the direction of the applied magnetic field. A fundamental conservation principle is that all electronic transitions between energy levels must conserve angular momentum. This requirement has the result that RCP light propagating in the direction of an applied magnetic field will induce only electronic transitions in which the quantum number $m_F$ increases by 1. These are referred to as $\sigma+$ transitions. Likewise LCP light propagating parallel to a magnetic field will induce only transitions wherein the quantum number $m_F$ decreases by 1, referred to as $\sigma-$ transitions. Because the energy change and resulting absorption wavelength associated with $\sigma+$ transitions differs from the wavelength of $\sigma-$ transitions, the effect of the magnetic field is to split a resonant absorption line into two groups of absorption lines. The amount of the splitting is approximately proportional to the strength of the applied magnetic field. This phenomenon is the well known Zeeman effect. Although a detailed explanation of the Zeeman effect can be complicated in reference to an arbitrary fluorescent substance such as Cs, the way in which the Zeeman effect is employed by the present invention is straightforward.

When 455.5 nm light is absorbed by atomic Cs in a Cs vapor cell, fluorescence light at 852 and 894 nm is produced. The fluorescence light can be detected by a suitable photodetector to produce an electronic signal S. If the signal of the fluorescence light is measured while varying the wavelength of excitation light around the value of 455.5 nm, a signal lineshape $S(\lambda)$ is obtained for zero magnetic field.

Figure 3A:
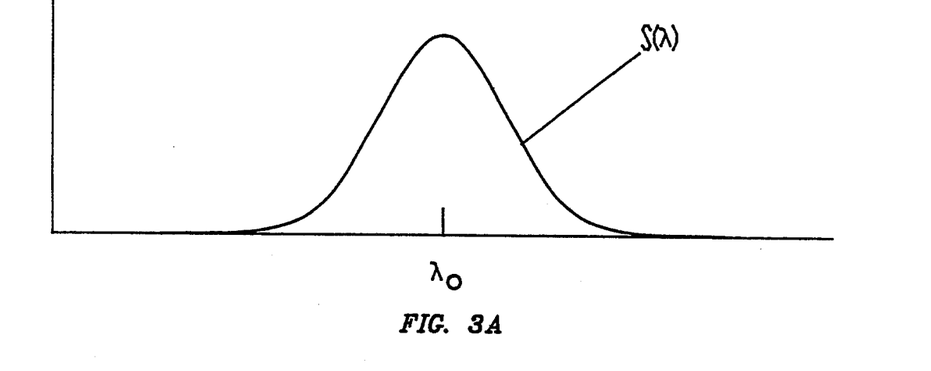
FIGS. 3A, 3B and 3C are illustrations of fluorescence signal lineshapes.

Referring to FIG. 3(a), $\lambda$ is wavelength and $\lambda_o$ is the wavelength at which $S(\lambda)$ is a maximum. The fluorescence signal lineshape is determined by the resonant absorption lineshape of the 455.5 nm transition, which consists of multiple transitions between various hyperfine energy levels as modified by Doppler effect broadening. The lineshape is approximately Gaussian, and a typical full width at half maximum (FWHM) of the signal is $3 \times 10^{-4}$ nm due to Doppler effect broadening. The Doppler effect broadening results from the motion of the atoms in the Cs vapor, and is dependent on the temperature at which the Cs vapor is maintained. A typical temperature which may be used is in the range of 50° to 150° Celsius. Temperature control is effected by use of heating elements (not illustrated) according to well understood methods employed in the fabrication and operation of Cs cells.

Figure 3B:
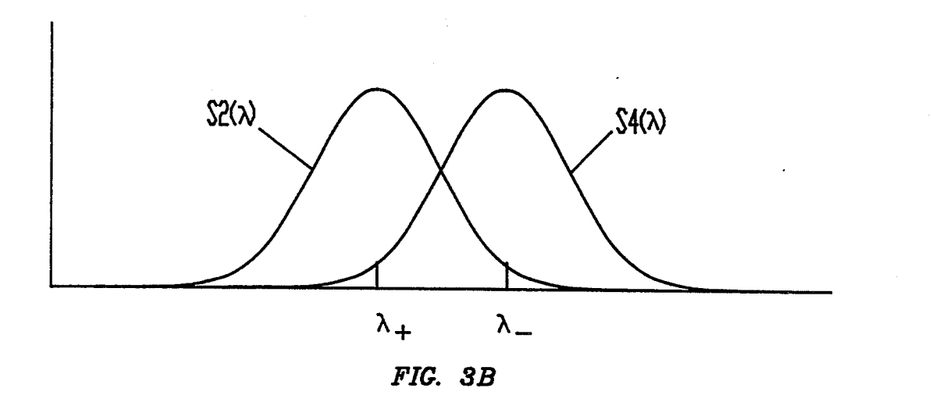
Figure 3C:
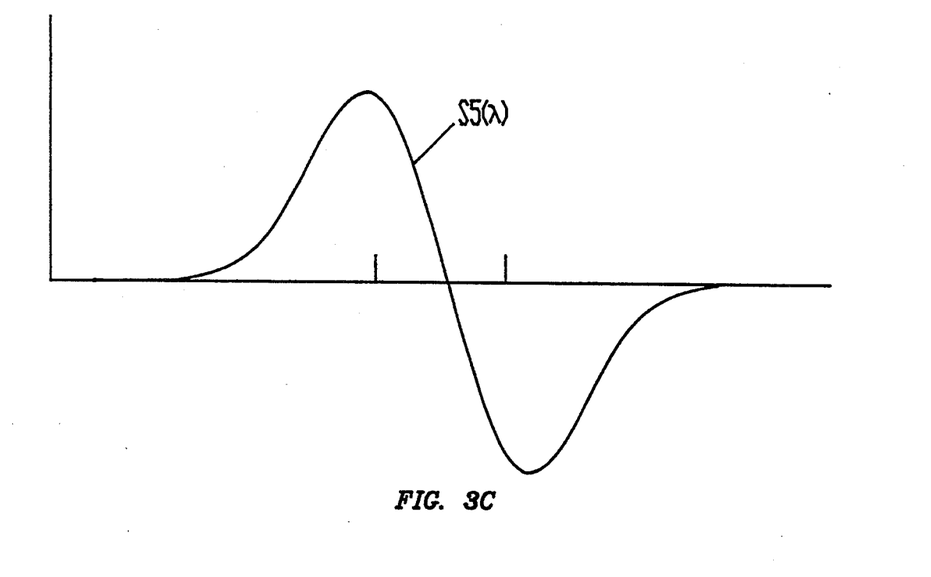

When a magnetic field of about 400 gauss is applied, the wavelength of $\sigma+$ transitions becomes less than the zero field wavelength and and the wavelength of $\sigma-$ transitions increases. If RCP light is used to excite $\sigma+$ transitions and a resultant signal S2 in response to fluorescence light FL1 is measured as a function of wavelength, then signal lineshape $S2(\lambda)$ illustrated in FIG. 3(b) is observed. Likewise, if LCP light is used to excite $\sigma-$ transitions and a resultant signal S4 in response to fluorescence light FL2 is measured as a function of wavelength, then signal lineshape $S4(\lambda)$ illustrated in FIG. 3(b) is observed. The separation of the signal lineshapes corresponding to the $\sigma+$ and $\sigma-$ transitions is due to Zeeman effect energy level splitting as discussed above. At an applied magnetic field of 400 gauss the separation of the signal lineshapes is about equal to the aforesaid typical $3 \times 10^{-4}$ nm FWHM of the signal lineshapes. The circumstance of signal lineshape separation approximately to signal FWHM is shown in FIG. 3(b) and 3(c). This is a convenient but not an essential circumstance. As will seen from teachings hereinbelow, any magnitude of signal lineshape separation can, in principle, be used.

In accordance with equations presented hereinbelow, the following quantities are defined: $S2(\lambda)$ is the fluorescence signal lineshape for $\sigma+$ transitions with a maximum at $\sigma=\sigma_+$; $S4(\lambda)$ is the fluorescence signal lineshape for $\sigma-$ transitions with a maximum at $\lambda=\lambda_-$; $S1(\lambda)$ is the signal lineshape for RCP light intensity obtained from photodetector PD1; and $S3(\lambda)$ is the signal lineshape for LCP light intensity obtained from photodetector PD3.

Error signal lineshape $S5(\lambda)$ is defined by EQU. 1:

$$S5(\lambda)=[A^*S2(\lambda)/S1(\lambda)]-[B^*S4(\lambda)/S3(\lambda)] \qquad [\text{EQU. 1}]$$

where A and B are normalization constants chosen for convenience so that $A^*S2(\lambda_+)/S1(\lambda_+)=1$ and $B^*S4(\lambda_-)/S3(\lambda_-)=1$.

If the laser output is uniform with respect to wavelength variation and time, then $S1(\lambda)$ and $S3(\lambda)$ will be constants. The use of $S1(\lambda)$ and $S3(\lambda)$ as compensation factors in EQU. 1 is for the purpose of compensating for variations of laser intensity and polarization with respect to wavelength and time. For some applications, if the laser is sufficiently stable, the use of the compensation factors may be unnecessary and $S5(\lambda)$ can be computed simply as the difference between $S2(\lambda)$ and $S4(\lambda)$.

It is readily seen that error signal lineshape $S5(\lambda)$ has a maximum value at $\lambda$ approximately equal to $\lambda_+$, a minimum value at $\lambda$ approximately equal to $\lambda_-$, and a value of zero at $\lambda$ approximately equal to $\lambda_o$. Error signal lineshape $S5(\lambda)$ is illustrated in FIG. 3(c).

Error signal S5 is computed from signals S1, S2, S3 and S4 derived from photodetectors PD1, PD2, PD3, and PD4 in accordance with EQU. 1 using signal processor SP by well understood signal processing methods. As an example, signals S1, S2, S3 and S4 can be converted to digital signals using sample and hold circuits and analog-to-digital converters. Error signal S5 can be computed using a digital computer according to standard methods. A controlling signal can then be produced using a digital-to-analog converter. The controlling signal can be suitably scaled and offset either by digital processing prior to digital-to-analog conversion, or by analog processing. The controlling signal is used to control wavelength adjusting means AM to stabilize the wavelength of laser system LS at any value between $\lambda_+$ and $\lambda_-$. Thus, the laser can be said to be providing an output wavelength which differs from the desired wavelength by an adjustable amount providing that both the output wavelength and the desired wavelength are between $\lambda_+$ and $\lambda_-$. This includes the case for which the laser wavelength differs from the desired wavelength by zero. Application of the instant invention is particularly useful if the desired wavelength is the wavelength $\lambda_o$, since error signal S5 changes sign, is relatively rapidly varying, and has maximum range for variation when the laser light wavelength is near this value.

An important advantage of the present invention over prior art is that the signals S1, S2, S3, and S4 are not restricted to slowly varying values for the invention to work as described. If the laser system is producing brief pulses of light, the resulting signals will also be brief pulses. The operations described hereinabove can be performed even if the signals are a sequence of separate pulses, or averages of multiple brief pulses.

Figure 4A:
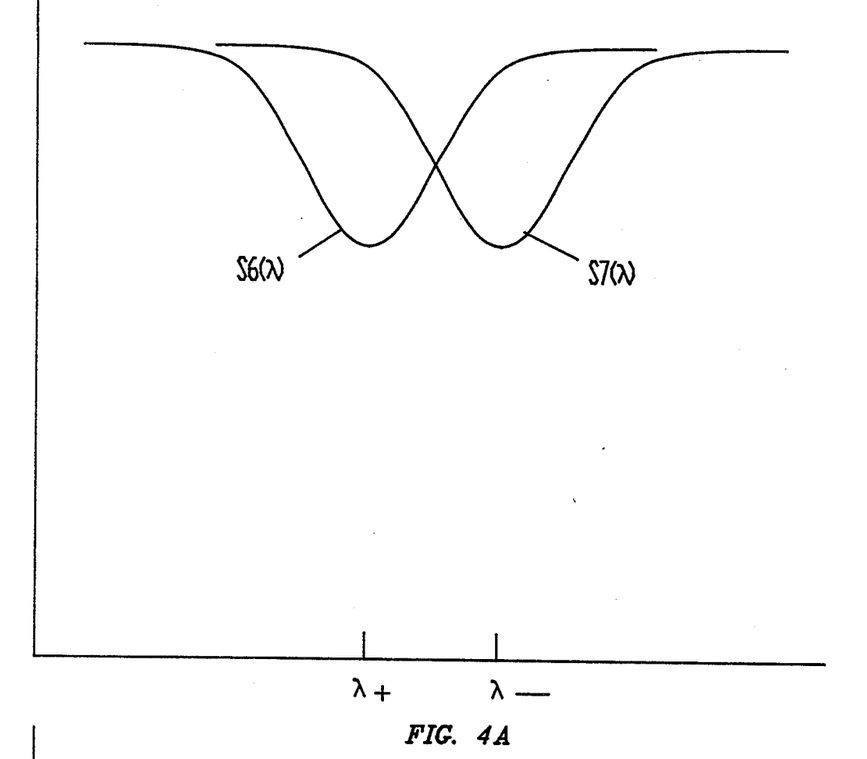
FIGS. 4A and 4B are illustrations of resonant optical absorption lineshapes.
Figure 4B:
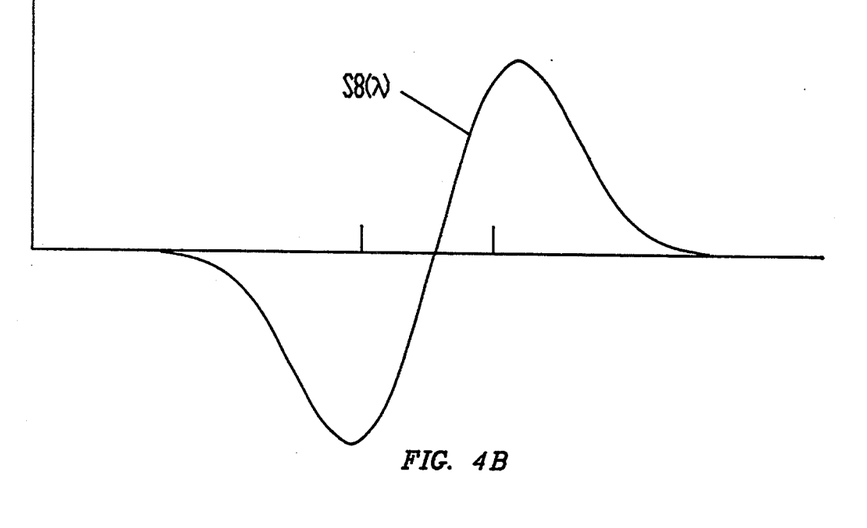

An alternative but generally less desirable method of operating the present invention is described in reference to FIG. 4(a) and 4(b). FIG. 4(a) illustrates absorption signal lineshapes $S6(\lambda)$ and $S7(\lambda)$ for transmitted RCP and LCP laser light, respectively. Absorption signal S6 is obtained from photodetector PD5 shown in FIG. 1. and absorption signal S7 is obtained from photodetector PD6. Absorption signal lineshapes $S6(\lambda)$ and $S7(\lambda)$ have respective minima at $\lambda_+$ and $\lambda_-$ as shown in FIG. 4(a).

Error signal lineshape $S8(\lambda)$ is defined according to EQU. 2:

$$S8(\lambda)=C^*S6(\lambda)/S1(\lambda)-D^*S7(\lambda)/S3(\lambda) \qquad [\text{EQU. 2}]$$

where C and D are constants chosen for convenience so that $S8(\lambda_o)$ equals 0 and the absolute value of $S8(\lambda_+)-S8(\lambda_-)$ is approximately equal to 1. As noted hereinabove, $S1(\lambda)$ and $S2(\lambda)$ are included as compensation factors to allow for laser instabilities, and for some applications the inclusion of the compensation factors may be unnecessary. Lineshape $S8(\lambda)$ is illustrated in FIG. 4(b).

An error signal S8 can be computed in accordance with EQU. 2 using a signal processor by methods which are substantially the same as those employed to compute error signal S5 as described hereinabove. The use of error signal S8 instead of error signal S5 is generally less desirable because the signal to noise ratio for measuring resonant optical absorption is generally less than the signal to noise ratio for measuring fluorescence light. The reason for this is that resonant optical absorption is typically a small fraction of the amount of transmitted light, However, if an application requires use of a substance in which fluorescence light is not observable, but resonant optical absorption can be observed, the practice of the present invention comprehends using error signal S8 as defined hereinabove in place of error signal S5 as an alternative method of operation.

Any substance belonging to the class or group of substances in which the effect of Zeeman splitting of resonant optical absorption lines can be observed, either by fluorescence or by optical absorption, can be employed within the scope of the present inventive concept. Examples include: various metal vapors including Cu vapor and alkali metal vapors; various metal compounds in vapor, liquid, or solid form; various metal atoms incorporated in crystalline or glassy substances such as Nd in YAG; rare earth elements in compounds which may be solid, liquid, or vapor; rare earth elements incorporated in crystalline or glassy substances; various dye molecules in solid, liquid, or vapor form; and various radioisotope compounds such as uranium isotope compounds in vapor form.

Many variations of the present invention will be obvious to persons with ordinary skill in the art. For example, light chopping means can be used to chop laser light beams LB4 and LB5 for synchronous detection. Chopped light beams can propagate on a common path through a single Cs cell since they can be separated by time rather than by space. Another alternative embodiment would use a single polarizing component RP or LP only, then propagate the light beams through two regions, a first region in which the fluorescent substance is placed in a magnetic field parallel to the direction of light propagation, and a second region in which the fluorescent substance is placed in a magnetic field antiparallel to the direction of light propagation. These, and many other modifications and variations of the present invention are possible in light of the above teachings. It is therefore to be understood that within the scope of the appended claims, the invention may be practiced otherwise than as specifically described.

What is claimed is:

1. Apparatus for stabilizing laser light comprising:
    wavelength adjusting means for adjusting the wavelength of laser light having a variable wavelength within an adjustable range of a desired wavelength;
    a first volume and a second volume of a substance, said substance being chosen from the group of fluorescent substances having observable Zeeman splitting of electronic energy levels;
    means for generating a magnetic field having a first magnetic field vector within said first volume and a second magnetic field vector within said second volume;
    a right circular polarizer, RCP;
    a left circular polarizer, LCP;
    means for propagating a first portion of said laser light through said RCP and through said first volume with the direction of propagation within said first volume being substantially parallel to said first magnetic field vector, said first portion producing a first fluorescence within said first volume;
    means for propagating a second portion of said laser light through said LCP and through said second volume with the direction of propagation within said second volume being substantially parallel to said second magnetic field vector, said second portion producing a second fluorescence within said second volume;
    a first detector disposed to produce a first signal representative of said first fluorescence;
    a second detector disposed to produce a second signal representative of said second fluorescence; and
    signal processing means connected to receive said first signal and said second signal for processing to produce an error signal indicative of the direction and magnitude of difference between said variable wavelength and said desired wavelength, said signal processing means having a means for converting said error signal into a controlling signal and connected to provide said controlling signal to said wavelength adjusting means.

2. The apparatus for stabilizing laser light according to claim 1 which further includes:
    means for separating a third portion of said laser light from said first portion;
    a third detector disposed to produce a third signal representative of said third portion;
    means for separating a fourth portion of said laser light from said second portion; and
    a fourth detector disposed to produce a fourth signal representative of said fourth portion, said signal processing means being connected to receive said third signal and said fourth signal for processing with said first signal and said second signal to produce said error signal.

3. The apparatus for stabilizing laser light according to claim 2 wherein said substance is a metal vapor.

4. The apparatus for stabilizing laser light according to claim 2 wherein said substance is an alkali metal vapor.

5. The apparatus for stabilizing laser light according to claim 2 wherein said substance is Cs vapor.

6. The apparatus for stabilizing laser light according to claim 2 wherein said means for generating a magnetic field includes an electromagnetic coil.

7. The apparatus for stabilizing laser light according to claim 2 wherein said first detector, said second detector, said third detector, and said fourth detector each include a photodetector chosen from the group of photodetectors consisting of photodiodes and photomultiplier tubes.

8. The apparatus for stabilizing laser light according to claim 2 wherein said signal processing means includes a digital computer.

9. The apparatus for stabilizing laser light according to claim 2 wherein said signal processing means processes said first signal, S2, said second signal, S4, said third signal, S1, and said fourth signal, S3, to produce error signal, S5, according to the relation $S5 = [S1(\lambda_+)/S2(\lambda_+)]*S2/S1 - [S3(\lambda_-)/S4(\lambda_-)]*S4/S3$, where $S1(\lambda_+)$ and $S2(\lambda_+)$ are the values of S1 and S2 measured at the laser light wavelength $\lambda_+$ for which S2 has a maximum value, and $S3(\lambda_-)$ and $S4(\lambda_-)$ are the values of S3 and S4 measured at the laser light wavelength $\lambda_-$ for which S4 has a maximum value.

10. The apparatus for stabilizing laser light according to claim 1 wherein said substance is a metal vapor.

11. The apparatus for stabilizing laser light according to claim 1 wherein said substance is an alkali metal vapor.

12. The apparatus for stabilizing laser light according to claim 1 wherein said substance is Cs vapor.

13. The apparatus for stabilizing laser light according to claim 1 wherein said means for generating a magnetic field includes an electromagnetic coil.

14. The apparatus for stabilizing laser light according to claim 1 wherein said first detector and said second detector each include a photodetector chosen from the group of photodetectors consisting of photodiodes and photomultiplier tubes.

15. The apparatus for stabilizing laser light according to claim 1 wherein said signal processing means includes a digital computer.

16. The apparatus for stabilizing laser light according to claim 1 wherein said signal processing means processes said first signal, S2, and said second signal, S4, to produce error signal, S5, according to the relation S5=S2−S4.

17. A method for stabilizing laser light comprising:
providing a wavelength adjusting means for adjusting the wavelength of laser light having a variable wavelength within an adjustable range of a desired wavelength;
providing a first volume and a second volume of a substance, said substance chosen from the group of fluorescent substances having observable Zeeman splitting of electronic energy levels;
producing a magnetic field having a first magnetic field vector in said first volume and a second magnetic field vector in said second volume;
propagating a first portion of said laser light through a right circular polarizer and then through said first volume with the direction of propagation in said first volume being substantially parallel to said first magnetic field vector;
propagating a second portion of said laser light through a left circular polarizer and then through said second volume with the direction of propagation in said second volume being substantially parallel to said second magnetic field vector;
selectively detecting a first fluorescence produced by said first portion in said first volume to provide a first signal;
selectively detecting a second fluorescence produced by said second portion in said second volume to provide a second signal;
processing said first signal and said second signal to produce an error signal indicative of the direction and magnitude of the difference between said variable wavelength and said desired wavelength;
converting said error signal into a controlling signal for controlling said wavelength adjusting means.

18. The method for stabilizing laser light according to claim 17 which further includes:
separating a third portion of said lager light from said first portion;
selectively detecting said third portion to produce a third signal;
separating a fourth portion of said laser light from said second portion;
selectively detecting said fourth portion to produce a fourth signal; and
processing said third signal and said fourth signal with said first signal and said second signal to produce said error signal.

19. The method for stabilizing laser light according to claim 18 wherein said substance is a metal vapor.

20. The method for stabilizing laser light according to claim 18 wherein said substance is an alkali metal vapor.

21. The method for stabilizing laser light according to claim 18 wherein said substance is Cs vapor.

22. The method for stabilizing laser light according to claim 18 wherein said producing a magnetic field includes using an electromagnetic coil.

23. The method for stabilizing laser light according to claim 18 wherein said selectively detecting said first fluorescence, said selectively detecting said second fluorescence, said selectively detecting said third portion, and said selectively detecting said fourth portion each include using a photodetector chosen from the group of photodetectors consisting of photodiodes and photomultiplier tubes.

24. The method for stabilizing laser light according to claim 18 wherein said processing said third signal and said fourth signal with said first signal and said second signal to produce said error signal includes using a digital computer.

25. The method for stabilizing laser light according to claim 18 wherein said processing said third signal, S1, and said fourth signal, S3, with said first signal, S2, and said second signal, S4, to produce said error signal, S5, includes using the relation $S5=[S1(\lambda_+)/S2(\lambda_+)]*S2/S1-[S3(\lambda_-)/S4(\lambda_-)]*S4/S3$, where $S1(\lambda_+)$ and $S2(\lambda_+)$ are the values of S1 and S2 measured at laser light wavelength $\lambda_+$ where S2 has a maximum value, and $S3(\lambda_-)$ and $S4(\lambda_-)$ are the values of S3 and S4 measured at laser light wavelength $\lambda_-$ where S4 has a maximum value.

26. The method for stabilizing laser light according to claim 17 wherein said substance is a metal vapor.

27. The method for stabilizing laser light according to claim 17 wherein said substance is an alkali metal vapor.

28. The method for stabilizing laser light according to claim 17 wherein said substance is Cs vapor.

29. The method for stabilizing laser light according to claim 17 wherein said producing a magnetic field includes using an electromagnetic coil.

30. The method for stabilizing laser light according to claim 17 wherein said selectively detecting said first fluorescence and said selectively detecting said second fluorescence each include using a photodetector chosen from the group of photodetectors consisting of photodiodes and photomultiplier tubes.

31. The method for stabilizing laser light according to claim 17 wherein said processing said first signal and said second signal to produce said error signal includes using a digital computer.

32. The method for stabilizing laser light according to claim 17 wherein said processing said first signal, S2, and said second signal, S4, to produce said error signal, S5, includes using the relation S5=S2−S4.

33. Apparatus for stabilizing lager light comprising:
wavelength adjusting means for adjusting the wavelength of laser light having a variable wavelength within an adjustable range of a desired wavelength;
a first volume and a second volume of a substance, said substance being chosen from the group of substances having observable Zeeman splitting of electronic energy levels by means of resonant optical absorption;

means for generating a magnetic field having a first magnetic field vector within said first volume and a second magnetic field vector within said second volume;

a right circular polarizer, RCP;

a left circular polarizer, LCP;

means for propagating a first portion of said laser light through said RCP and through said first volume with the direction of propagation within said first volume substantially parallel to said first magnetic field vector;

means for propagating a second portion of said laser light through said LCP and through said second volume with the direction of propagation within said second volume substantially parallel to said second magnetic field vector;

a first detector disposed to receive said first portion after propagation through said first volume, said first detector producing a first signal representative of said first portion;

a second detector disposed to receive said second portion after propagation through said second volume, said first detector producing a second signal representative of said second portion;

signal processing means connected to receive said first signal and said second signal for processing to produce an error signal indicative of the direction and magnitude of difference between said variable wavelength and said desired wavelength, said signal processing means having a means for converting said error signal into a controlling signal and connected to provide said controlling signal to said wavelength adjusting means.

34. The apparatus for stabilizing laser light according to claim 33 which further includes:

means for separating a third portion of said laser light from said first portion;

a third detector disposed to produce a third signal representative of said third portion;

means for separating a fourth portion of said laser light from said second portion; and a fourth detector disposed to produce a fourth signal representative of said fourth portion, said signal processing means being connected to receive said third signal and said fourth signal for processing with said first signal and said second signal to produce said error signal.

35. The apparatus for stabilizing laser light according to claim 34 wherein said substance is a metal vapor.

36. The apparatus for stabilizing laser light according to claim 34 wherein said substance is an alkali metal vapor.

37. The apparatus for stabilizing laser light according to claim 34 wherein said substance is Cs vapor.

38. The apparatus for stabilizing laser light according to claim 34 wherein said means for generating a magnetic field includes an electromagnetic coil.

39. The apparatus for stabilizing laser light according to claim 34 wherein said first detector, said second detector, said third detector, and said fourth detector each include a photodetector chosen from the group of photodetectors consisting of photodiodes and photomultiplier tubes.

40. The apparatus for stabilizing laser light according to claim 34 wherein said signal processing means includes a digital computer.

41. The apparatus for stabilizing laser light according to claim 33 wherein said substance is a metal vapor.

42. The apparatus for stabilizing laser light according to claim 33 wherein said substance is an alkali metal vapor.

43. The apparatus for stabilizing laser light according to claim 33 wherein said substance is Cs vapor.

44. The apparatus for stabilizing laser light according to claim 33 wherein said means for generating a magnetic field includes an electromagnetic coil.

45. The apparatus for stabilizing laser light according to claim 33 wherein said first detector and said second detector each include a photodetector chosen from the group of photodetectors consisting of photodiodes and photomultiplier tubes.

46. The apparatus for stabilizing laser light according to claim 33 wherein said signal processing means includes a digital computer.

47. The apparatus for stabilizing laser light according to claim 33 wherein said signal processing means processes said first signal, S6, and said second signal, S7, to produce error signal, S8, according to the relation $S8 = S6 - S7$.

48. The apparatus for stabilizing laser light according to claim 34 wherein said signal processing means processes said first signal, S6, said second signal, S7, said third signal, S1, and said fourth signal, S3, to produce error signal, S8, according to the relation $S8 = [S1(\lambda_+)/S6(\lambda_+)]*S6/S1 - [S3(\lambda_-)/S7(\lambda_-)]*S7/S3$, where $S1(\lambda_+)$ and $S6(\lambda_+)$ are the values of S1 and S6 measured at the laser light wavelength $\lambda_+$ for which S6 has a minimum value, and $S3(\lambda_-)$ and $S7(\lambda_-)$ are the values of S1 and S7 measured at the laser light wavelength $\lambda_-$ for which S7 has a minimum value.

49. A method for stabilizing laser light comprising:

providing a wavelength adjusting means for adjusting the wavelength of laser light having a variable wavelength within an adjustable range of a desired wavelength:

providing a first volume and a second volume of a substance, said substance chosen from the group of fluorescent substances having observable Zeeman splitting of electronic energy levels;

producing a magnetic field having a first magnetic field vector in said first volume and a second magnetic field vector in said second volume;

propagating a first portion of said laser light through a right circular polarizer and then through said first volume with the direction of propagation in said first volume being substantially parallel to said first magnetic field vector;

propagating a second portion of said laser light through a left circular polarizer and then through said second volume with the direction of propagation in said second volume being substantially parallel to said second magnetic field vector:

selectively detecting said first portion after propagation through said first volume to provide a first signal;

selectively detecting said second portion after propagation through said second volume to provide a second signal;

processing said first signal and said second signal to produce an error signal indicative of the direction and magnitude of the difference between said variable wavelength and said desired wavelength;

converting said error signal into a controlling signal for controlling said wavelength adjusting means.

50. The method for stabilizing laser light according to claim 49 which further includes:

separating a third portion of said laser light from said first portion;

selectively detecting said third portion to produce a third signal;

separating a fourth portion of said laser light from said second portion;

selectively detecting said fourth portion to produce a fourth signal; and processing said third signal and said fourth signal with said first signal and said second signal to produce said error signal.

51. The method for stabilizing laser light according to claim 50 wherein said substance is a metal vapor.

52. The method for stabilizing laser light according to claim 50 wherein said substance is an alkali metal vapor.

53. The method for stabilizing laser light according to claim 50 wherein said substance is Cs vapor.

54. The method for stabilizing laser light according to claim 50 wherein said producing a magnetic field includes using an electromagnetic coil.

55. The method for stabilizing laser light according to claim 50 wherein said selectively detecting said first portion, said selectively detecting said second portion, said selectively detecting said third portion, and said selectively detecting said fourth portion each include using a photodetector chosen from the group of photodetectors consisting of photodiodes and photomultiplier tubes.

56. The method for stabilizing laser light according to claim 50 wherein said processing said third signal and said fourth signal with said first signal and said second signal to produce said error signal includes using a digital computer.

57. The method for stabilizing laser light according to claim 50 wherein said processing said third signal, S1, and said fourth signal, S3, with said first signal, S6, and said second signal, S7, to produce said error signal, S8, includes using the relation $S8=[S1(\lambda_+)/S6(\lambda_+)]*S6/S1-[S3(\lambda_-)/S7(\lambda_-)]*S7/S3$, where $S1(\lambda_+)$ and $S6(\lambda_+)$ are the values of S1 and S6 measured at laser light wavelength $\lambda_+$ where S6 has a minimum value, and $S3(\lambda_-)$ and $S7(\lambda_-)$ are the values of S3 and S7 measured at laser light wavelength $\lambda_-$ where S7 has a minimum value.

58. The method for stabilizing laser light according to claim 49 wherein said substance is a metal vapor.

59. The method for stabilizing laser light according to claim 49 wherein said substance is an alkali metal vapor.

60. The method for stabilizing laser light according to claim 49 wherein said substance is Cs vapor.

61. The method for stabilizing laser light according to claim 49 wherein said producing a magnetic field includes using an electromagnetic coil.

62. The method for stabilizing laser light according to claim 49 wherein said selectively detecting said first portion and said selectively detecting said second portion each include using a photodetector chosen from the group of photodetectors consisting of photodiodes and photomultiplier tubes.

63. The method for stabilizing laser light according to claim 49 wherein said processing said first signal and said second signal to produce said error signal includes using a digital computer.

64. The method for stabilizing laser light according to claim 49 wherein said processing said first signal, S6, and said second signal, S7, to produce said error signal, S8, includes using the relation $S8=S6-S7$.

* * * * *